125,212

UNITED STATES PATENT OFFICE.

CHARLES MOTIER NES, OF YORK, PENNSYLVANIA.

IMPROVEMENT IN THE MANUFACTURE OF IRON FROM MILL-CINDER.

Specification forming part of Letters Patent No. 125,212, dated April 2, 1872.

*To whom it may concern:*

Be it known that I, CHARLES M. NES, of York, county of York and State of Pennsylvania, have invented certain new and useful Improvements in the Manufacture of Iron, of which the following is a specification:

At rolling-mills, large quantities of mill-cinder containing from forty-five to fifty per cent. of carbonized metallic iron are cast away as worthless from this fact—viz., that the impurities of the pig-iron when melted and manufactured into wrought-iron have been taken up by the silica to make this cinder; ordinary mill-cinder having been proved by analysis to contain from one to two per cent. of phosphorus, sulphur, &c.

Large quantities of fine charcoal, and of anthracite coal-dust are found at coal-mines, coal-yards, furnaces, &c., which are considered worthless and allowed to go to waste. I propose to utilize the same in the following manner: I take mill-cinder and grind it fine in any machine suitable for the purpose, and wash out all the lighter parts. The remainder will yield eighty per cent. of metallic iron. To remove the impurities from this, I use the magnetic silicide of iron ore, commonly known as Codorus ore, found in York county, Pennsylvania, and in other places. The affinity of phosphorus, sulphur, and the like impurities for this ore while in a state of fusion, is such that they readily attack it and unite with it, thus passing off in the form of slag. I take of this washed cinder, which contains eighty per cent. of iron, one hundred pounds; magnetic silicide of iron ore, ten per cent.; coal-dust, forty pounds; burnt lime, twenty pounds. I mix these ingredients well in an ordinary bed, such as is used for mixing mortar, adding water sufficient to give it such a consistency as to admit of being molded into blocks of any desired size. I put the blocks in the air to dry, and when sufficiently dry I place them in a blast-furnace, and treat as ore is ordinarily treated in such furnace. I can also use an ordinary cupola.

This cinder being already carbonized from heat can be readily reduced in a cupola or run out, not requiring deoxidation or carbonization as ordinary iron ore, but is already pig-iron merely united with silica. The lime in direct union acts as a flux, causing the metal to flow readily and separate from the cinder. The ore takes the phosphorus and other impurities, and the waste coal assists the smelting and saves fuel.

I have described the process which I prefer for the manufacture of iron from the cinder; but it is manifest that the same may be varied, as well as the proportions of the ingredients specified as entering into the composition of the block, and also that other ingredients may be added, or may be substituted in lieu of the lime and coal-dust, the gist of the invention consisting in the use of the magnetic silicide of iron ore in connection with the cinder.

What I claim, therefore, is—

1. The manufacture of cast or pig-iron from mill-cinder, in a blast or other suitable furnace, substantially in the manner herein described.

2. And I also claim the employment of the ore herein specified, for separating the metallic part of mill-cinder from the impurities mixed with the same, substantially as herein set forth.

In testimony whereof I have signed my name to this specification before two subscribing witnesses.

CHARLES MOTIER NES.

Witnesses:
   JOHN A. WILSON,
   JOHN W. STEWART.